Aug. 19, 1969    J. H. VENEMA    3,461,671
DUAL MASTER CYLINDER

Filed Oct. 17, 1967    2 Sheets-Sheet 1

JACK H. VENEMA
INVENTOR.

BY John R. Faulkner
Clifford L. Sadler

ATTORNEYS

Aug. 19, 1969

J. H. VENEMA 3,461,671

DUAL MASTER CYLINDER

Filed Oct. 17, 1967

JACK H. VENEMA
INVENTOR.

BY *John R. Faulkner*
*Clifford L. Sadler*

ATTORNEYS

United States Patent Office 3,461,671
Patented Aug. 19, 1969

3,461,671
DUAL MASTER CYLINDER
Jack H. Venema, Newport, Mich., assignor to Ford Motor
Company, Dearborn, Mich., a corporation of Delaware
Filed Oct. 17, 1967, Ser. No. 675,938
Int. Cl. F15b 7/08; F16d 65/32
U.S. Cl. 60—54.6                                9 Claims

ABSTRACT OF THE DISCLOSURE

A dual master cylinder for a split hydraulic brake system having primary and secondary chambers separated by a movable shuttle-partition. The master cylinder provides balanced pressures between the two portions of the split system during normal brake operation and restricts the loss in hydraulic displacement in the event of a failure of one portion of the system.

Background of the invention

In an automotive hydraulic braking system utilizing a conventional single piston master cylinder, a break or leak anywhere in the system may result in the complete loss of braking ability. A known method of preventing such a loss of braking ability is to use a master cylinder having two pressure chambers and operating some of the individual wheel cylinders from one of the chambers and the other wheel cylinders from the second chamber.

The use of such a split system with a dual master cylinder gives rise to design complications not experienced with single chamber systems. A method to effect substantially simultaneous actuation of the various wheel cylinders in any brake system is considered desirable. A means to apportion displacement between the front and rear wheel brakes during normal operation is also desirable insofar as maximum braking is generally achieved with greater displacement to the front wheel cylinders than to the rear wheel cylinders. Finally, with the split system it is desirable to have a construction that satisfactorily performs these operations without a significant loss of displacement or increase in pedal travel accompanying a hydraulic failure in one of the wheel cylinder lines.

Prior art is replete with dual master cylinder devices that perform some but not all of the aforementioned functions or that utilize a construction that is intricate and not capable of economical mass production or continued reliable operation. It is, therefore, an object of this invention to provide an economical, reliable dual master cylinder construction for a split hydraulic braking system that has a balancing means between the primary and secondary pressure chambers effecting substantially simultaneous actuation of the individual wheel cylinders, that has an apportioning means to provide a greater displacement to one portion of the split system than to the other portion, and which experiences only a limited displacement loss and a slight pedal travel increase upon a hydraulic line failure.

Brief summary of the invention

A dual master cylinder constructed in accordance with this invention includes a stepped piston received within a cylindrical bore having an open end and a terminal end. The piston includes a greater diameter rearward portion which slidably engages the bore and a lesser diameter forward portion about which a cylindrically shaped shuttle is positioned. The outer cylindrical surface of the shuttle slidably engages the bore while the inner cylindrical surface of the shuttle slidably engages the forward portion of the piston. The shuttle is biased against an abutment located near the forwardmost end of the piston by a spring positioned along the forward portion of the piston. A second spring biases the piston rearwardly toward an abutment within the bore adjacent the open end.

The bore, piston and shuttle define primary and secondary compression chambers. The shuttle functions as an axially movable, sealed partition between the primary chamber and the secondary chamber which responds to pressure differentials between the two compression chambers.

A stud projecting into the bore cooperates with an annular groove of the shuttle to limit the axial movement of the shuttle in the event of a failure of one of the portions of the split system.

An optional electrical circuit closing warning light switch may be operated by the extreme axial movements of the shuttle.

Brief description of the drawings

FIGURE 1 also shows schematically the brake line and the individual wheel cylinders;

Detailed description of the invention

Figure 1:
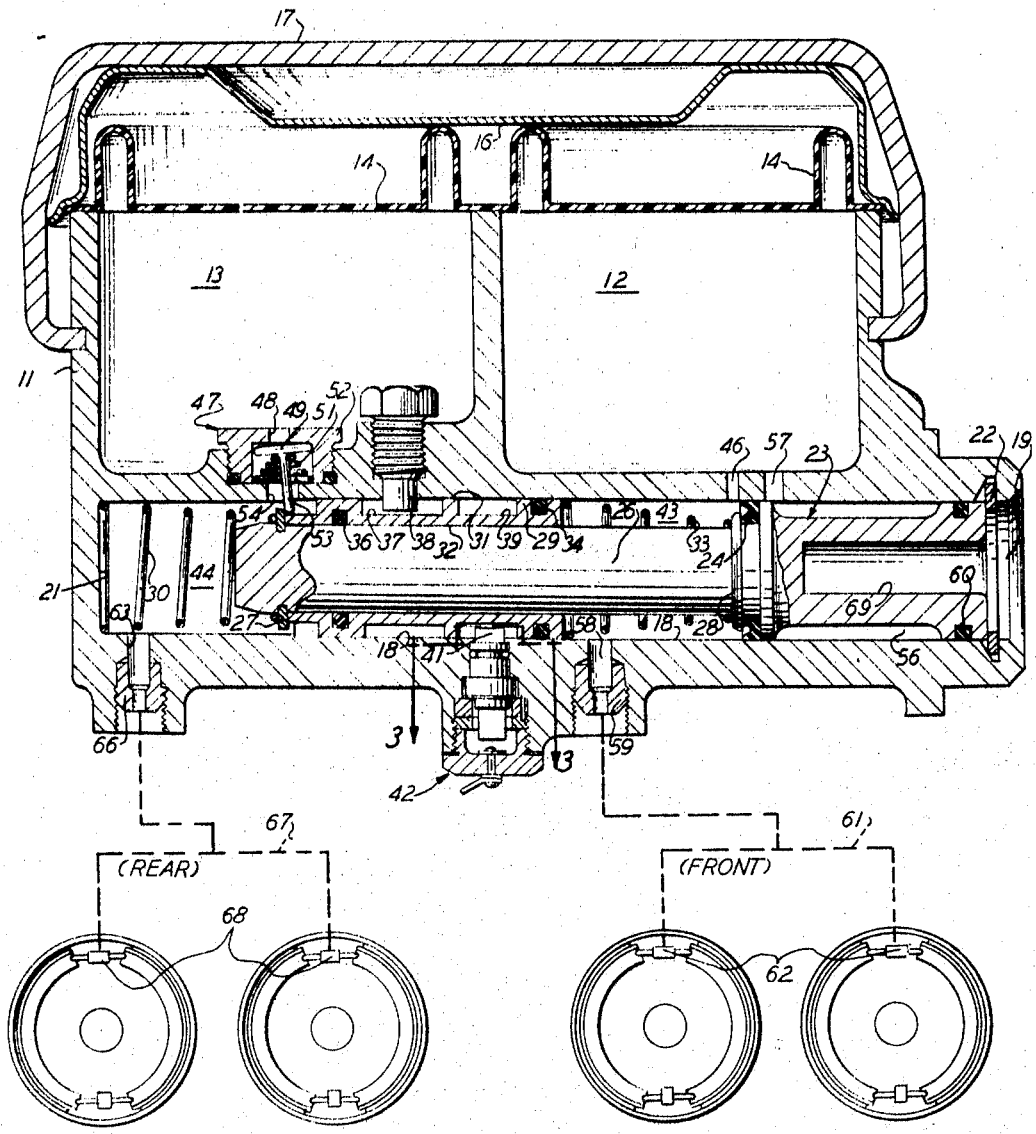
FIGURE 1 is an elevational view in section of a dual master cylinder which incorporates a preferred embodiment of the invention showing the normal positions of elements at a time when the vehicle brakes are not applied.

FIGURE 1 discloses a dual master cylinder for a split hydraulic brake system including a housing 11 having an upper portion that is divided into front and rear reservoir chambers 12 and 13, respectively. The open ends of the reservoir chambers 12 and 13 are sealed by a flexible rubber diaphragm 14 that has a plurality of corrugations to enhance its flexibility. A cover or lid 16 is positioned over the diaphragm 14 and is sealed along the edges of the reservoirs 12 and 13 by a retainer 17 that holds the perimeter of the cover 16 against diaphragm 14 at the upper end of master cylinder housing 11.

Cylindrical bore 18 extends horizontally within housing 11 from open end 19 to terminal end 21. A snap ring 22 is positioned in a groove in bore 18 near open end 19 and acts as a return abutment for a piston 23 when it is in its normal right-hand, retracted position. Piston 23 is received within housing 11 and slidably engages bore 18 at high pressure seal 24. A reduced diameter portion 26 of piston 23 extends axially forward from high pressure seal 24 toward terminal end 21. Adjacent the forward end of the portion 26 of piston 23 is snap ring 27 which engages a groove in the piston and forms a radially outwardly extending abutment. A coil spring 30 compressed between terminal end 21 of bore 18 and snap ring 27 biases piston 23 rightwardly, toward abutment with snap ring 22. A radially outwardly extending flange 28 is formed in piston 23 at the rearward end of reduced diameter portion 26. A cylindrically shaped shuttle 29 slidably engages bore 18 along its outer surface 31 and slidably engages the portion 26 of piston 23 along its inner surface 32. A compressed coil spring 33 is positioned about the piston portion 26 between flange 28 and one end of shuttle 29 and resiliently urges shuttle 29 toward engagement with snap ring 27.

Shuttle 29 is formed with a radially outwardly facing annular groove which carries an O-ring 34 that provides a sliding seal between the body of shuttle 29 and bore 18. A radially inwardly facing annular groove of shuttle 29 carries a second O-ring 36 which provides a sliding seal between the body of shuttle 29 and the reduced portion 26 of piston 23. An annular groove 37 formed in shuttle 29 receives a protruding portion of a stud 38 and permits limited axial movement of shuttle 29 within bore 18 until one of the sides of groove 37 contacts stud 38. Another annular groove 39, axially spaced apart from groove 37, receives protruding, rotatable fin 41 of warning light switch 42.

A primary or front brake compression chamber 43 is defined in part by bore 18, seal 24 of piston 23, reduced diametered portion 26 of piston 23, and shuttle 29. A secondary or rear brake compression chamber 44 is defined in part by bore 18, terminal end 21, reduced diametered portion 26 of piston 23, and shuttle 29. Shuttle 29 is axially movable relative to piston 23 and relative to bore 18 to provide a movable partition between primary chamber 43 and secondary chamber 44 during normal brake application.

When the vehicle brakes are not applied, brake fluid enters the primary or front brake chamber 43 from reservoir 12 through compensating port 46. High pressure seal 24 of piston 23 is located to the right of compensating port 46 when piston 23 is in its right-hand retracted position. As piston 23 moves initially to the left during brake application, high pressure seal 24 traverses compensating port 46 and closes chamber 43 from communication with reservoir 12.

Fluid enters pressure chamber 44 when the vehicle brakes are not applied, from reservoir 13 by passing through a tilting valve assembly 47. The assembly 47 includes a compensating port 48 that is sealable by a valve element 49 having a T-shaped cross section. A spring 51 urges the valve element 49 into sealed engagement across the lower end of the port 48. In this embodiment, the compensating port 48 is shown formed in a threaded plug 52 which engages the housing 11. The valve element 49 includes a downwardly protruding stem portion 53 which extends through a port 54 in the wall of housing 11. The stem portion 53 extends into the pressure chamber 44 and is enagageable by the snap ring 22 to tilt valve element 49 and to open port 48 when the piston 23 is in the right-hand retracted position as seen in FIGURE 1. When the piston 23 moves to the left during brake application, snap ring 22 no longer engages stem portion 53 and valve element 49 closes port 48.

An annular recess 56 formed within the right-hand portion of piston 23 is in constant communication with reservoir 12 via fluid return 57 to permit hydraulic fluid leaking past high pressure seal 24 to return to reservoir 12. Recess 56 and reservoir 12 are at or near atmospheric pressure at all times during brake operation. An annular seal 60 of piston 23 prevents the loss of fluid from recess 56.

An outlet port 58 transmits hydraulic brake fluid from primary compression chamber 43 through fitting 59 to the primary or front wheel hydraulic lines 61 and the corresponding wheel cylinders 62 of the front wheel brakes. Similarly, outlet port 63 transmits fluid from secondary compression chamber 44 through pipe fitting 66 to the secondary or rear wheel hydraulic system lines 67 and the corresponding wheel cylinders 68 of the rear wheel brakes.

A blind bore 69 is formed at the right end of piston 23 to receive a pushrod (not shown) of a master cylinder actuating mechanism. The pushrod is connected to a brake pedal at one end and inserted into bore 69 at its other end.

Figure 3:
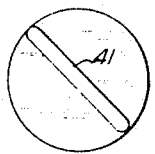
FIGURE 3 is a view of section 3—3 shown in FIGURE 1 which shows the normal position of the switch actuator fin when the brakes are not applied.
Figure 4:
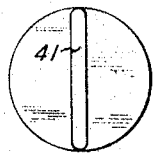
FIGURE 4 is a view of section 4—4 shown in FIGURE 2 showing the position of the switch actuator fin at a time when there is a hydraulic failure in the secondary portion of the split system during brake application.

The master cylinder may be used with or without the hydraulic failure warning light switch shown generally at 42. The switch 42 may be of any conventional electrical contact switch design. The switch 42 is actuated by the axial displacement in either direction of shuttle 29. One of the sides of groove 39 engages fin 41 of switch 42 to rotate the fin from a 45° angle position as shown by FIGURE 3 to a position perpendicular to the bore axis as shown in FIGURE 4. As the fin 41 approaches the position shown in FIGURE 4, the switch 42 completes a circuit which operates to warn the vehicle driver of a loss of hydraulic pressure in one of the chambers 43 or 44.

Operation

FIGURE 1 illustrates the normal positions of the elements of the dual master cylinder at a time when the vehicle brakes are not applied. Piston 23 is biased into an extreme right-hand position against snap ring 22 by coil spring 30. High pressure seal 24 of piston 23 is positioned rightwardly of compensating port 46 permitting hydraulic fluid from reservoir 12 to fill chamber 43. Near the forward end of the piston, snap ring 27 of piston 23 engages stem portion 53 so as to tilt valve portion 49 and open compensating port 48 permitting brake fluid from reservoir 12 to enter chamber 44.

The cross sectional areas of bores 18 and 32 are determined according to the volume requirements of the primary and secondary hydraulic systems.

On initial movement of piston 23 within bore 18 during a normal braking operation, seal 24 traverses port 46 to seal chamber 43 from reservoir 13. At the same time, snap ring 27 moves leftwardly with piston 23 permitting spring 51 and the hydraulic pressure within chamber 44 to force valve means 49 into sealing engagement with a portion of the threaded plug 52 and to close port 48 from reservoir 13.

Because of the normal tolerances attendant commercial mass production, it is unlikely that the displacement required to actuate the front wheel brakes will be exactly equal to the displacement of the primary chamber 43. Similarly, it is unlikely that the displacement required to actuate the rear wheel brakes will be exactly equal to the displacement from the secondary chamber 44. Since it is also unlikely that the variances between the chamber outputs and the wheel cylinder requirements of the primary system will be exactly equal to those of the secondary system, a means to compensate for variances in displacement requirements and to balance the pressures of the two systems becomes desirable. For example, if the displacement from chamber 44 were slightly more than the requirements of wheel cylinders 68, the pressure buildup in wheel cylinders 68, hydraulic lines 67 and chamber 44 would precede the high pressure buildup in wheel cylinder 62, hydraulic lines 61, and chamber 43. A significant pressure differential would be avoided by shuttle 29 axially moving slightly to the right so as to reduce the pressure in chamber 44 and increase the pressure in chamber 43.

Should a hydraulic failure occur in lines 61 or other parts of the primary or front wheel portion of the split system during braking of the vehicle, the pressure in chamber 44 would force the shuttle 29 rightwardly until the left side of groove 37 abuts against stud 38. The resulting loss in displacement to the secondary or rear portion of the split brake system would be only that required to move shuttle 29 rightwardly until it engages stud 38.

Figure 2:
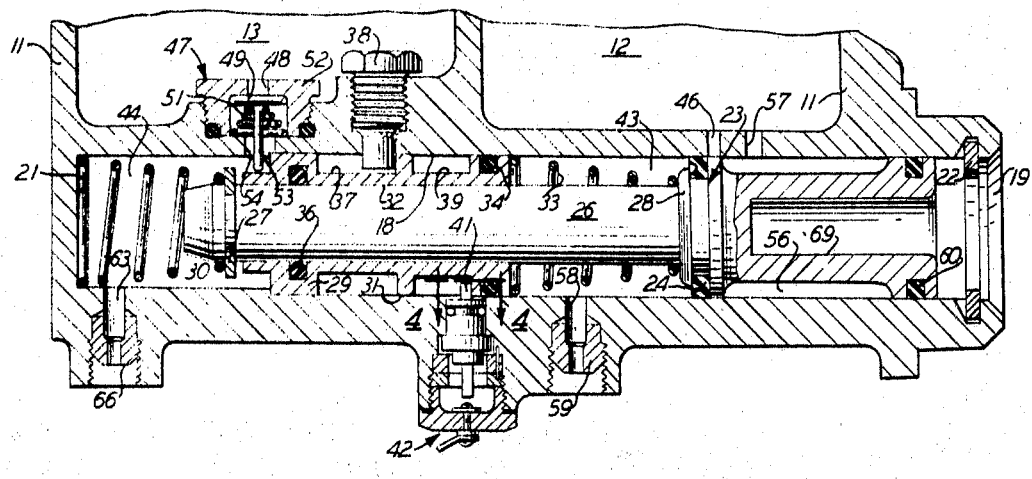
FIGURE 2 is a sectional view of a portion of the master cylinder of FIGURE 1 showing the positions of the elements during a failure in the secondary portion of the split brake system upon brake application.

Should a hydraulic failure occur in lines 67 or other parts of the secondary or rear wheel portions of the split brake system during braking of the vehicle, the pressure in the front or primary chamber 43 would force shuttle 29 leftwardly until the right side of slot 37 abuts stud 38, as shown in FIGURE 2. The displacement loss to the primary system is thus limited to the displacement required to move shuttle 29 leftwardly until the right side of groove 37 abuts against stud 38.

Switch 42 is so located so that when shuttle 29 is in either its extreme right-hand or extreme left-hand axial position, one of the sides of groove 39 has engaged fin 41 and moved it into a position from that shown in FIGURE 3 to that shown in FIGURE 4 and a warning light circuit is closed.

Because the pressure of chamber 43 is essentially the same as the pressure of chamber 44 during normal braking operations, seals 34 and 36 of shuttle 29 carry only nominal or no pressure differentials. It is only when there is a hydraulic failure in one portion of the system that seals 34 and 36 become high pressure seals. Seal 60 of piston 23 carries reservoir 13 pressure which is at or near atmospheric pressure. Seal 24 of piston 23 is the only high pressure sliding seal during normal operation. This reduction in the number of high pressure sliding seals reduces the cost and increases the reliability of the embodiment as compared with prior art devices requiring a plurality of such seals.

In summary, it may be seen that this invention provides a dual master cylinder for a split brake system having a pressure balancing mechanism between the two chambers and which apportions the total displacement between the front portion and the rear portion of the split system. Unlike prior art devices performing apportioning and balancing functions, with this invention there is only a limited loss of displacement in the operative portion of the brake system upon a failure in one portion of the split system.

The foregoing description presents the presently preferred embodiment of the invention. Modifications and alterations will occur to those skilled in the art that are included within the scope and spirit of the following claims.

I claim:

1. A dual master cylinder for a vehicle brake system having a housing,
   a first bore formed in said housing having an open end and a terminal end,
   a shuttle means received within and slidingly engaging said first bore,
   a second bore coaxial with said first bore formed within said shuttle means,
   piston means slidingly engaging said first bore and said second bore,
   a first compression chamber and a second compression chamber formed in part by said first bore, said shuttle means and said piston means,
   said shuttle means forming a slidable separation between said first and said second compression chambers and being movable within said first bore in response to pressure differentials between the two said chambers,
   said piston means having an abutment portion adjacent its terminal end portion,
   said shuttle means being biased toward said abutment portion and engaging said abutment portion when the vehicle brakes are not applied.

2. A dual master cylinder according to claim 1 and including
   one axial side of said shuttle means defining in part said first compression chamber, the other side of said shuttle means defining in part said second compression chamber.

3. A dual master cylinder for a vehicle brake system including:
   a cylindrical bore having an open end and a terminal end,
   piston means slidably received within said cylindrical bore,
   said piston means having a larger diametered portion and a lesser diametered portion,
   said lesser diametered portion extending from said larger diametered portion toward said terminal end,
   said piston means having abutment means adjacent the axially extreme portions of said lesser diametered portion,
   shuttle means positioned between said abutment means and slidingly engaging said cylindrical bore,
   said shuttle means formed with a bore which slidingly engages said lesser diametered portion of said piston means,
   said cylindrical bore, piston means and shuttle means defining a first compression chamber and a second compression chamber,
   said first chamber separated from said second chamber by said shuttle means.

4. A dual master cylinder according to claim 3 including stop means in said cylindrical bore limiting the axial movement of said shuttle means within said cylindrical bore.

5. A dual master cylinder according to claim 3 including
   spring means biasing said shuttle means axially away from said larger diametered portion of said piston means toward engagement with one of said abutment means.

6. A dual master cylinder according to claim 3 including
   electrical circuit closing means actuated by prescribed axial movement of said shuttle means.

7. A dual master cylinder according to claim 3 and including
   one axial side of said shuttle means defining in part said first compression chamber, the other side of said shuttle means defining in part said second compression chamber.

8. A dual master cylinder according to claim 3 including
   first spring means biasing said piston means toward the open end of said cylindrical bore to a normal piston position,
   second spring means biasing said shuttle means axially away from said larger diametered portion of said piston means to a normal shuttle position,
   said piston means being axially movable within said cylindrical bore away from said normal piston position to decrease the volume of said chambers and to provide fluid displacement therefrom,
   said shuttle means being axially movable in either direction of said normal shuttle position within said cylindrical bore in response to pressure differentials between said chambers during movement of said piston means from the normal piston position toward the terminal end of said bore.

9. A dual master cylinder according to claim 8 including
   electrical circuit closing means actuated by prescribed axial movement of said shuttle means.

References Cited

UNITED STATES PATENTS 2,353,304   7/1944   Green.
3,151,459   10/1964  Brukner.

MARTIN P. SCHWADRON, Primary Examiner
ROBERT R. BUNEVICH, Assistant Examiner

U.S. Cl. X.R.

188—152